United States Patent [19]

Wang et al.

[11] Patent Number: 4,975,336

[45] Date of Patent: Dec. 4, 1990

[54] ARTICLE FOR DATA STORAGE OF MAGNETO-OPTICAL DISK

[75] Inventors: Yinjun Wang; Jianxiang Shen; Qian Tang; Zhao H. Li, all of Beijing, China

[73] Assignee: Institute of Physics Chinese Academy of Sciences, Beijing, China

[21] Appl. No.: 343,592

[22] Filed: Apr. 27, 1989

[30] Foreign Application Priority Data

Apr. 28, 1988 [CN] China ............................... 8810222.5

[51] Int. Cl.$^5$ .......................... G11B 5/62; C22C 12/00
[52] U.S. Cl. .................................... 428/626; 428/630; 428/642; 428/428; 428/463; 420/577
[58] Field of Search ............... 420/434, 577; 428/611, 428/630, 639, 626, 640, 642, 627, 632, 427, 428, 433, 457, 463; 252/62.55

[56] References Cited

U.S. PATENT DOCUMENTS

| | | | |
|---|---|---|---|
| 3,615,892 | 10/1971 | Heinzelman et al. | 428/639 |
| 4,543,301 | 9/1985 | Yazawa et al. | 428/642 |
| 4,833,020 | 5/1989 | Shiroishi et al. | 428/611 |

FOREIGN PATENT DOCUMENTS 28162  12/1965  Japan ................................. 420/434

OTHER PUBLICATIONS

Journal of Allied Physics, vol. 35, No. 3, Mar. 1964, D. Chen and Y. Gondo, "Temperature in Oriented MnBi Films" pp. 1024–1025.

Journal of Applied Physics, vol. 41, No. 3, Mar. 1970, D. Chen, R. L. Aagard & T. S. Liu–"Magneto-Optic Properties of Quenched then Films of MnBi and Optical Memory Experiements", p. 1395–1396.

Japanese Journal of Applied Physics, vol. 26, No. 5, May 1987 pp. 707–712, Morio MasudamIchiro Izawa, Seiji Yoshino, Sigeru Shiomi & Susumu Uchiuama "Preparation, Magetic and Magneto-Optic Properties of Small-Crystallite MnBi Films".

Primary Examiner—Theodore Morris
Assistant Examiner—George Wyszomierski
Attorney, Agent, or Firm—Cushman, Darby & Cushman

[57] ABSTRACT this invention relates to an alloy material for data storage of magneto-optical disk (ADSMO), as well as its manufacturing process. ADSMO is based on manganese, bismuth and doped with aluminum atoms and silicon atoms or by aluminum atoms and boron atoms. The above mentioned elements are deposited onto a transparent substrate in a certain sequence using an evaporation process or sputtering process, and then compact hexagonal cyrstalline structures are formed after being annealed in vacuum. ADSMO has a large magneto-optical Kerr rotation, a small size of crystal grains and a stable structure; its manufacturing process is easy and simple.

3 Claims, 4 Drawing Sheets

ARTICLE FOR DATA STORAGE OF MAGNETO-OPTICAL DISK

BACKGROUND OF THE INVENTION

1. Field of the invention

This invention relates to an alloy material for data storage and specifically to an alloy material for data storage of a magneto-optical disk and its manufacturing process. This material is characteristically based an MnBi alloy, doped with Al atoms and Si (or B) atoms. Said alloy material for data storage of a magneto optical disk in the present invention can overcome the shortcomings existing in various magneto-optical films conventionaly used at present and it satisfies the requirements with respect to a magneto-optical disk for data storage and audio, video techniques.

2. Description of Prior art

Presently, the development of computer and data storage technique needs such a material so as to be capable of storing large amounts of data which can be written in or erased again and again by lasers while the data storage function does not vary. The material of the present invention simultaneously provide the following features: i.e., it has a small signal-noise ratio (S/N) and it is not affected by temperature variation. Furthermore, its preparation process is easy and simple.

For the time being, the magneto-optical disk is widely used and several conventionally used materials for manufacturing magneto-optical disk are as follows:

(1) Amorphous crystal TbFeCo or GdTbFeCo. Such materials have advantages such as an amorphous state, i.e. the atoms are not arranged in order, no crystal grains nor noise from grain boundaries. However, the magneto-optical disk manufactured with this kind of material has a small signal-noise ratio S/N, because the S/N ratio is proportional to the magneto-optical Kerr rotation $\theta k$ of the material and TbFeCo or GdTbFeCo generally have a magneto-optical Kerr rotation 0.35°–0.40°; in addition, as this kind of material is amorphous, after being heated, its ageing is very easy, it is unstable along with temperature variation; meanwhile, as this is a rare earth material, it is subject to oxidation and expensive.

(2) yttrium iron garnet YIG film. This material is crystalline, its drawback is that the growth temperature reaches up to 600° C. Hence, during its manufacture, an anti-high temperature material, such as quartz must be used as the substrate. Besides, the grain size (d) of this material generally is larger, its surface is tougher and the application effect turns out to be not very good and it needs a high power laser to write in.

(3) Superlattice film. This is a regulating film of superposed layers interstitially made of a transitional metal e.g. iron (Fe) and of a rare earth metal such as Terbium (Tb) respectively. It is also an amorphous material. As it has many layers superimposed, its interior, especially its interface has internal strain and the crystal lattice between iron/(Fe) and terbium (Tb) is mismatched; as a result, the magneto-optical disk manufactured with this material assumes unstationary, changeable performances in use and the Kerr rotation is small.

(4) Manganese bismuth (MuBi) alloy film. This is a crystalline material as well; and it has a larger magneto-optical Kerr rotation, around 0.7°. But its curie point Tc is high. In addition, when the material is quenched from 375° C. (near The Curie point) to room temperature corresponding to the write-in or erase process of the magneto-optical disk, its Kerr rotation will drop significantly. The grain size (d) of a manganese bismuth (Mubi) alloy material is about a few microns. Such a large grain size leads to a decrease of the read-out signal/noise ratio of the magneto-optical disk. Because of the above mentioned reasons, the practical application of this material is almost impossible.

SUMMARY OF THE INVENTION

Prior art reference relating to the present invention are given, for example, as follows:

(1) D. Chan et al. J. Appl. Phys. P.P. 1395, Vol, 41, No. 3, published on Mar. 1, 1970.

(2) Morio Masuda, Japanese Journal of Appl. Phys. P.P. 707–712, Vol. 26, No. 5, published in May, 1987.

(3) D. Chen and Y. Gondo. J. Appl. Phys, P.P. 1024 Vol. 35, No. 3, published in March 1964.

An object of the present invention is to overcome the forestated drawbacks existing in the above mentioned materials so as to satisfy the requirements for data storage and audio, video techniques on magneto-optical disks.

Another object of the present invention is to provide a new type of alloy material for data storage of magneto-optical disks having a larger magneto-optical Kerr rotation.

Another object of the present invention is to provide a new type of alloy material for data storage of magneto-optical disks having a smaller crystal grain size (d).

Another object of the present invention is to provide a new type of alloy material for data storage of magneto-optical disks having a larger signal/noise ratio(S/N).

Another object of the present invention is to provide a new type of material for data storage of magneto-optical disk so that while being heated, e.g. at a temperature higher than the Curie point, and while being quenched, the crystal structure of the material will be stable and unchanged.

Another object of the present invention is to provide a manufacturing process for producing the data storage material of the magneto-optical disks, i.e., initially many kinds of crude materials are superimposed in sequence, and then at suitable temperatures, they are annealed.

Yet another object of the present invention is to provide the manufacturing materials for the data storage material of the magneto-optical disks, i.e., initially many kinds of materials are periodically superimposed in sequence by vacuum sputtering and then they are annealed at suitable temperatures.

This manufacturing process of the present invention is easy and simple. It is suitable for large scale production and has a lower cost. The data storage material manufactured by the present process, has many excellent features, e.g. it has a larger magmeto-optical rotation $\theta k$ at room temperature, when measurement wavelength is 633 nm, it reaches 2.5°, (without any dielectric overcoat for purposes of Kerr rotation enhancement) six times larger then the magneto-optical Kerr rotation of an amorphous material $\theta k \approx 0.40$. Its crystal grain size (d) is as small as 400 Å and thus it has a larger signal/noise ratio S/N. The X-ray measurement proves that said material has a stable compact hexagonal crystalline structure with the c axis of the hexagon being perpendicular to the base facet (002) of the hexagon; the crystal grain of the material surface is fine and compact having metallic brightness and higher reflectivity. Furthermore, the characteristics of the material will not be affected by the variations of the operating temperature.

It can be seen from the figure that the magneto-optical roation $\theta k$, saturation magnetization Ms as well as the coercive force Hc of the alloy material in the present invention basically do not vary with the quenching temperature, while the $\theta'$, the Ms', and the Hc' of the MnBi alloy film in the prior art vary greatly along with temperature.

Figure 4:
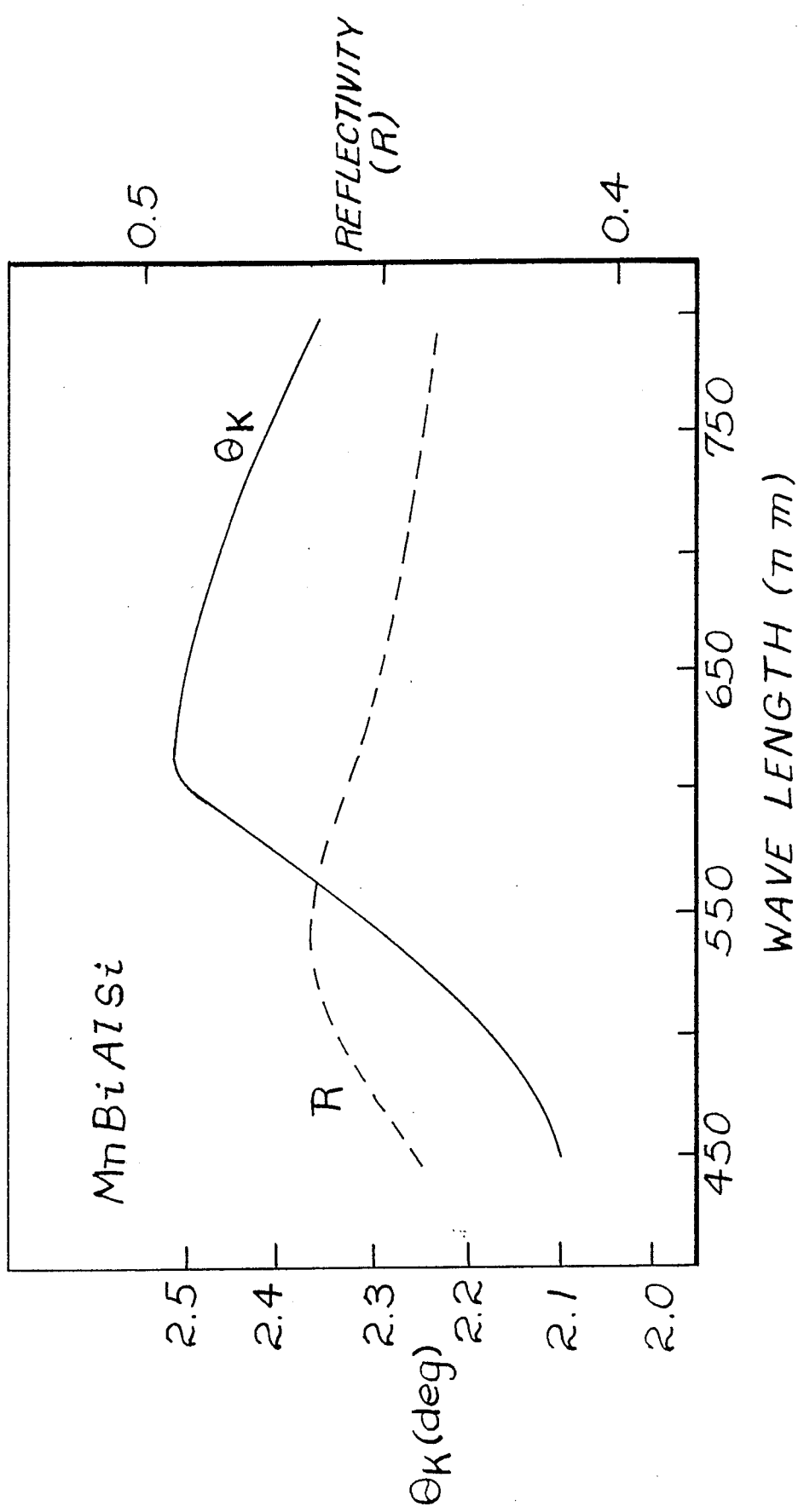

FIG. 4 shows a curve for the dependence of reflectivity on the wave length, a curve for the dependence of Kerr rotation $\theta k$ on the wave length $\lambda$ measured from mnBiAlSi alloy material for data storage of the magneto-optical disks manufactured by the process of the present invention. It can be seen from this figure that at the wavelength=633 nm, the magneto-optical preferred value $\theta k$ is very large, about more than 6 times as large as that of the amorphous TbFeCo or GdTbFeCo presently in trial use.

DETAILED DESCRIPTION OF THE INVENTION

A detailed description is given below of the alloy material of the present invention for data storage of magneto-optical disks and the manufacturing process thereof.

The Alloy Material for Data Storage of Magneto-Optical Disks

FIG. 1–FIG. 4 show various features of the alloy material for data storage of the magneto-optical disks provided by the manufacturing process of the present invention. Such material includes manganese (Mn) bismuth (Bi) and aluminum (Al) Silicon (Si); it is based on Mn Bi and doped with Al atoms, Si atoms. It can be expressed by the molecular formula $Mn_1Bi_xAl_ySi_z$ of which the preferred proportions of the various elements are as follows:

given the atom number of Mn=1,
then the atom number of Bi=X≈0.7–1.0,
the atom number of Al=y≈0.2–0.5 and
the atom number of Si=Z≈0.5–2, The various above-mentioned elements are evaporated or sputtered in sequence onto a transparent substrate under vacuum conditions in accordance with the above proportions. Glass or plastics can be used as the substrate and the plastic substrate can be for example, polymethyl acrylate. While $SiO_2/Mn/Bi/Al$ or $Al/Mn/Bi/SiO_2$ are deposited in sequence on a clean transparent substrate, pentaboron trinitride ($B_5N_3$) can be used instead of silicon dioxide ($SiO_2$) and $B_5N_3/Mn/Bi/Al$ or $Al/Mn/Bi/B_5N_3$ are deposited in sequence to form a multilayer film of the alloy material for data storage of magneto-optical disks on the transparent substrate. The forestated multi-layer film is annealed for 3–5 hours between 300°–380° C. under vacuum conditions and then cooled to room temperature. This film after being annealed has excellent performances.

The performance quality of the alloy material for data storage of magneto-optical disks is generally expressed and marked by the magnitude of the physical quantities indicative of the magneto-optical preferred values:

$$\text{magento-optical merit } \theta k \cdot \sqrt{R}$$

wherein $\theta k$ represents the magneto-optical Kerr rotation, and
R represents the reflectivity of the material.

The larger are $\theta k$ and R, the better marked are the performances of the alloy material for data storage of the magneto-optical disks. The magneto-optical Kerr rotation $\theta k$ of the alloy material for data storage of the magneto-optical disks in the present invention is about 2.5°, six times larger than that of the amorphous material in the prior art. Its reflectivity R is around 45%, which is equivalent to that in the prior art, and its crystal grain size measures is around 400 Å. The annealing temperature of the material according to the present invention drops to 300° C., so that an inexpensive magneto-optical disk base-glass substrate can be used. Meanwhile, the grain size (d) is made even smaller. Such smaller grain size (d) will be beneficial for the signal/-noise ratio S/N, thus favoring high density data storing and audio-video recording. Furthermore, it can be seen from FIG. 3 that when the temperature drops from 500° C. to room temperature during quenching, the Kerr rotation $\theta k$, the saturation magnetization Ms, as well as the magnetic coercive force Hc of the said alloy material basically do not vary. This is favorable for repetitive uses of the material and very convenient for keeping stored data and keeping magneto-optical disks having audio video recordings for a long period of time.

Process for Manufacturing the Alloy Material for Data Storage of Magneto-Optical Disks Evaporation process:

A piece of transparent substrate or glass substrate or polymethyl acrylate is prepared. After being cleansed, it is put into a vacuum chamber. Meanwhile silicon dioxide ($SiO_2$), manganese (Mn), bismuth (Bi) or prefabricated manganese bismuth (MuBi) alloy as weil as aluminum (Al), are put in. Their dosage is determined according to the atomic percentage proportions of the various above-mentioned elements. For example, if the dosage of manganese (Mn) is one atom-gram, then the dosage (x) of bismuth (Bi) will be 0.7 atom gram and the dosage y of aluminum (Al) will be 0.2-0.5 atom-gram, the dosage (z) of silica will be 0.5-2.0 atom gram. The purity of manganese (Mn), bismuth (Bi), aluminum (Al) and silicon dioxide ($SiO_2$) is required to be not lower than the chemical purity. When the vacuum in the chamber reaches $10^{-6}$-$10^{-7}$Torr silicon dioxide ($SiO_2$), manganese (Mn), bismuth (Bi) and aluminum (Al) in their own crucibles are heated respectively to a temperature slightly higher than their respective melting point. They are then evaporated onto the transparent substrate in sequence to form a transparent substrate/$SiO_2$/Mn/Bi/Al multilayer thin film, or aluminum (Al) is first evaporated and $SiO_2$ is lastly evaporated to form a transparent substrate/Al/Mn/Bi/$SiOp_2$ multiplayer thin film. If the order of evaporating Mn and Bi is exchanged a transparent substrate/$SiO_2$/Bi/Mn/Al multilayer thin film or transparent substrate/ Al/Bi/Mn/$SiO_2$ multiplayer thin film is formed. After being evaporated, the said thin film is annealed in the vacuum chamber at 300° C. for 3-5 hours and then cooled to room temperature. Annealing leads to a sufficient reaction of manganese (Mn) and bismuth (Bi) to form a perfectly oriented compact hexagonal crystalline structure, with the c-axis perpendicular to the base facet (002) of the hexagon. Meanwhile, silicon (Si) atoms and aluminum (Al) atoms will diffuse into the substitial positions of the hexogonal crystal unit cell and into the crystal grain boundaries to produce the material having excellent features as shown in the figures, thus overcoming degrading after high temperature quenching, of the performances for the manganese (Mn) bismuth (Bi) alloy material in the prior art. After measurement, the thickness of the silicon dioxide ($SiO_2$) in the thin film is determined to be 1000-200 Å; manganese (Mn) bismuth (Bi) alloy layer thereof has a thickness of 500-1000 Å and aluminum (Al) layer thereof has a thickness of around 200 Å.

Sputtering Process:

If the MnBiAlSi alloy material for data storage is manufactured by sputtering process, it is necessary to prepare an aluminum (Al) target, a silicon dioxide ($SiO_2$) target, a manganese (Mn) target and bismuth (Bi) target first. The target preparing technique is known to the average skilled person in the art and is unnecessary to be mentioned anymore herein.

Afte being cleansed, the transparent substrate or the glass substrate or the polymethyl acrylate substrate is put into the sputtering chamber. When the vacuum reaches $10^{-6}$-$10^{-8}$ Torr, an inert gas argon (Ar), is introduced, this filling the sputtering chamber and at an applied voltage, the argon (Ar) ions will bombard in sequency the above silicon dioxide ($SiO_2$) target, manganese (Mn) target, bismuth (Bi) target and aluminum (Al) target, or the argon (Ar) ions will first bombard the aluminum (Al) target and then the manganese (Mn) target, the bismuth (Bi) target and the silicon dioxide ($SiD_2$) target in sequence to form a transparent substrate/$SiO_2$/Mn/Bi/Al thin film or transparent substrate /Al/Mn/Bi/$SiO_2$ thin film. If the bombardment order of manganese (Mn) and bismuth (Bi) is exchanged, then a transparent substrate/Al/Bi/Mn/$SiO_2$ thin film or a transparent substrate/Al/Mn/Bi/$SiO_2$ multilayer then film can be formed. The thickness of the silicon dioxide ($SiO_2$) layer is 1000-2000 Å; that the manganese bismuth (MuBi) layer is 500-1000 Å; and that of the aluminum (Al) layer is around 200 Å. The sputtered thin film is put into the vacuum chamber with a vacuum of $10^{-6}$-$10^{-8}$ Torr and annealed at 300°-380° C. for 3-5 hours and then cooled to room temperature. Now the substrate/$SiO_2$/Mn/Bi/Al multilayer thin film or substrate/Al/Mn/Bi/$SiO_2$ multilayer thin film is well manufactured. Such multilayer thin films having the substrate/Al/Mn/Bi/$SiO_2$ structure are better alloy materials for data storage or magneto-optical disks.

If, in the above manufacturing process, $B_5N_3$ is used instead of $SiO_2$ without any change of other technological procedures, then a substrate/BN/Mn/Bi/Al multilayer thin film or substrate/Al/Mn/Bi/BN multilayer thin film can be formed. They are similarly very nice alloy materials for data storage of magneto-optical disks.

PREFERRED EMBODIMENT

A preferred embodiment of manufacturing an alloy material for data storage of magneto-optical disks is introduced herewith. The sputter process is an example of manufacturing a multilayer thin film of ADSMO (alloy material for data storage of magneto-optical disk).

Firstly, it is necessary to prepare aluminum (Al) target, a silicon dioxide ($SiO_2$) target, a manganese (Mn) target and bismuth (Bi) target.

After being cleansed, a transparent substrate, such as a glass substrate, is put into the sputtering chamber. When the vacuum reaches $10^{-6}$-$10^{-8}$. Torr, an inert gas, argon (Ar), is introduced so as to fill the sputtering chamber and ionized by an applied high voltage. The argon (Ar) ion will bombard in sequence the said aluminum (Al) target. Aluminum (Al) is deposited onto said glass substrate. The thickness of the aluminum (Al) layer is controlled to be about 200 Å. As the bombard time is increased, the thickness of aluminum (Al) layer increases, and then said manganese (Mn) target, bismuth (Bi) target (or Bi target, Mn target in sequence) are separately bombarded, The repetition bombarded numbers can be from 1 to more than 100, and an overlapping film or multilayer MnBi (or BiMn), MnBi (or BiMn) . . . is formed. The total thickness is about 500-1000 Å. Finally, said silicon diozide ($SiO_2$) layer is sputtered, the thickness of which is about 1000-2000 Å. In this way, an overlapping multilayer thin film of glass substrate/Al/Mn/Bi/$SiO_2$ or glass substrate/Al/ Bi/Mn/$SiO_2$ can be formed. The said sputtered thin film is annealed in the chamber with a vacuum of $10^{-6}$-$10^{-8}$ Torr at 300°-380° C. for 3-5 hours and then cooled to room temperature. The anneal temperature is 50°-80° C. lower than that of the formation of alloy material (MnBi). When said thin film is annealed at a lower temperature, the manganese (Mn), bismuth (Bi) atoms in the neighborhood can be diffused into each other, rather than be diffused within a scope of longer distance. Annealing manganese (Mn) and bismuth (B) at a lower temprature, can form a fine and compact hexagonal crystalline structure with best orientations of crystalline structure. The grain size (d) can be decreased to e.g., $d \approx 400$ Å, so that the noise produced by grain boundaries of said overlapping multilayer film can be reduced, and then the signal noise ratio S/N would be increased.

Figure 1:
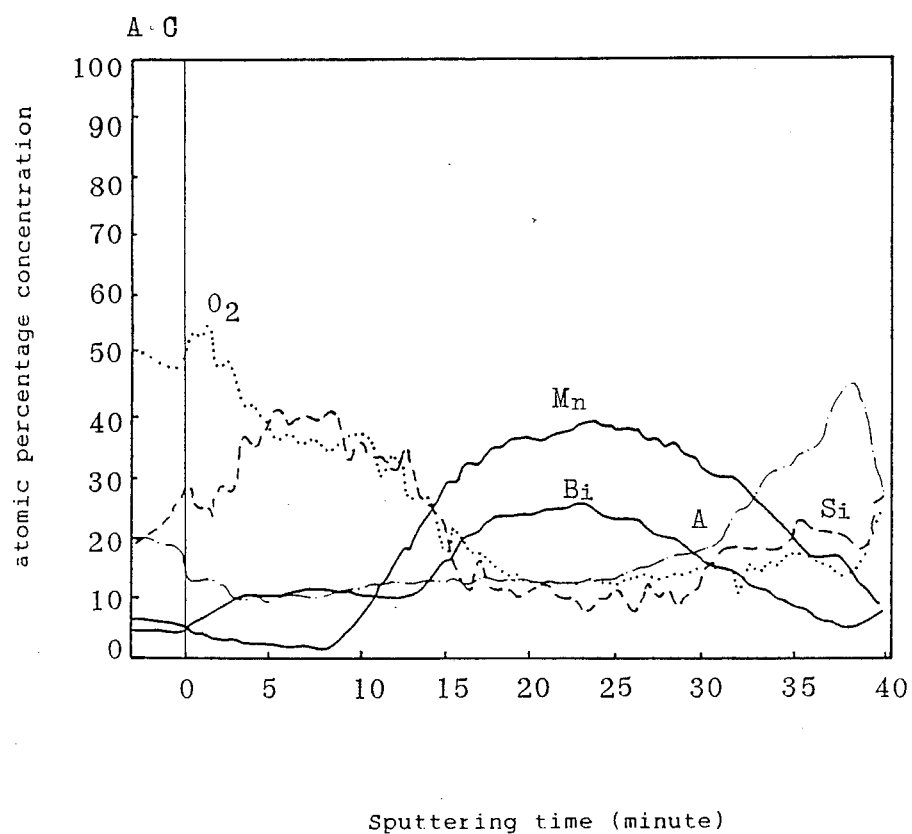
FIG. 1 shows an atomic percentage concentration of various elements in different layers of the MnBiAlSi alloy film for data storage of a magneto-optical disk manufactured by the process of the present invention. The abscissa shows the delaminating time (min.) of the material, representative of the various layers of the material; the ordinate shows the atomic percentage concentration.
Figure 2:
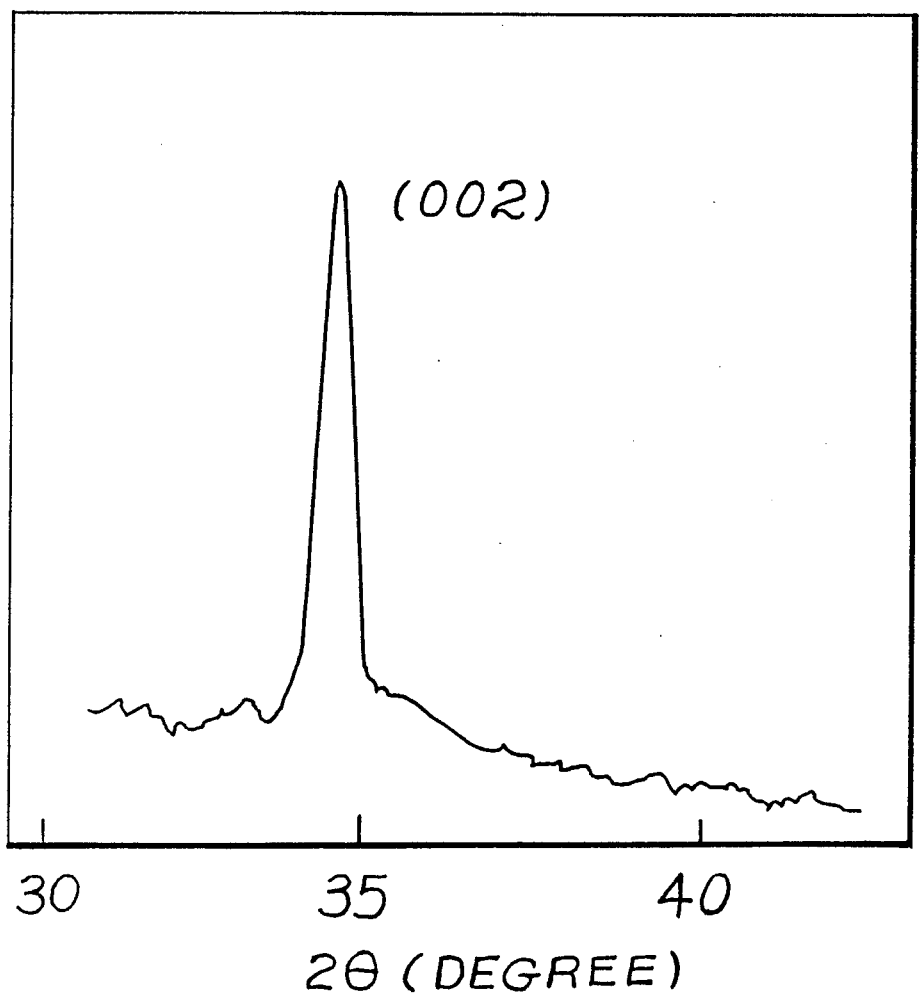
FIG. 2 shows the results of the X-ray structure analysis (CoKα target) on the MnBiAlSi alloy material for data storage of magneto-optical disks manufactured by the process of the present invention. The abscissa indicates the diffraction angle $2\theta$; the ordinate shows the diffraction intensity. It can be seen from this figure that there is a peak value at $2\theta \approx 35°$. This indicates that the material of the present invention has a perfectly-oriented hexagonal compact crystal structure which is the same as MnBi the c axis is perpendicular to the base facet (002) and the material is homogeneous.
Figure 3:
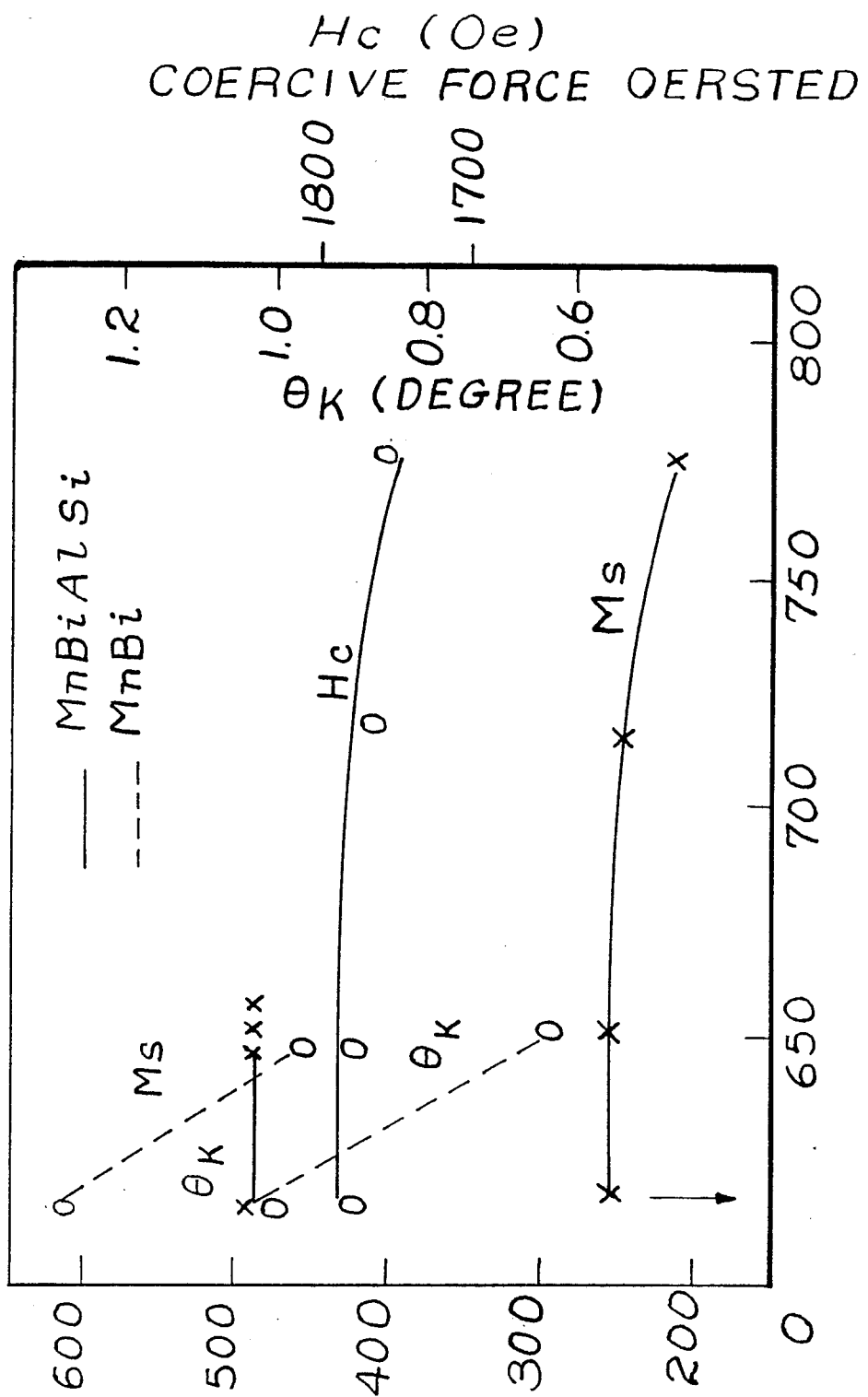
FIG. 3 shows a curve for the dependence of magneto-optical Kerr rotation $\theta k$ on the quenching temperature (T), a curve for the dependence of saturation magnetization intensity (Ms) on the quenching temperature; and a curve for the dependence of the coercive force (Hc) on the quenching temperature, measured from the MnBiAlSi alloy material for data storage of the magneto-optical disk manufactured by the process of the present invention.

When annealing the over lapping multilayer thin film, the aluminum atoms and the silicon occupy the interstitial sites in the maganese (Mn) bismuth (Bi) crystal unit cell, whereby said overlapping multilayer thin film has a good temperature stability. As shown in FIG. 3, the curves of 74 k, Ms and Hc largely do not vary with the quenching temperature (T). It can be seen that, the preferred embodiment of the present invention overcomes the problems existing in the prior art. i.e., during annealing, the performances of said manganese (Mn) bismuth (Bi) become worse. And instead, said magneto-optical Kerr rotation θk can be increased significantly, and said grain size can be finer. All of these are requried for the material used for data storage of magneto-optical disks.

In summary, the magneto-optical preferred values of said alloy material for data storage of magneto-optical disks in the present invention are far better than those of amorphous TbfeCo. The performances of said alloy material for data storage of magneto-optical disk of the present invention are also preferred over those of the MnBi crystalline alloy material. Comparing said alloy material for data storage of magneto-optical disk with the MnBi alloy material of the prior art the present invention is characterized in that it has a much larger magneto-optical effect; it overcomes the following shortcomings existing in MnBi, produced by beng quenched, i.e. the performance become worse. Compare to the amorphous crystal TbTeCo and GdTbFe, the material of the present invention is characterized in that it has a larger magneto-optical Kerr rotation θk and is not easy to become aged, nor to be oxidized. The material of the present invention has a higher reflectivity, a fine and compact crystalline orientation, a stable crystal grain structure and is not affected by temperature changes. Said process of manufacturing of the present invention is simple and easy to operate, is economical for large scale product, resulting in a bright prospect for widespread application.

What is claimed is:

1. An article for data storage of a magneto-optical disk consisting of a transparent substrate and an alloy material on said substrate, said alloy material consisting of the elements manganese, bismuth, aluminum and silicon, said alloy material being based on a manganese bismuth alloy doped with aluminum atoms and silicon dioxide, said aluminum, manganese, bismuth and silicon dioxide having been deposited, in sequence, on said transparent substrate so as to form a multilayer film on said transparent substrate, after which said film have been heat treated so that the various layers of said multilayer film diffuse into each other to form said alloy material, wherein the proportions of the elements in said alloy material is expressed by the molecular formula:

$$Mn_1 Bi_x Al_y Si_z$$

wherein
$x \approx 0.7-1.0$
$y \approx 0.2-0.5$ and
$z \approx 0.5-2$.

2. The alloy material of claim 1 wherein said transparent substrate is glass.

3. The alloy material of claim 1 wherein said transparent substrate is polymethyl acrylate.

* * * * *